(No Model.)  3 Sheets—Sheet 1.
L. G. SPENCER.
CHILD'S CARRIAGE.
No. 338,798.  Patented Mar. 30, 1886.
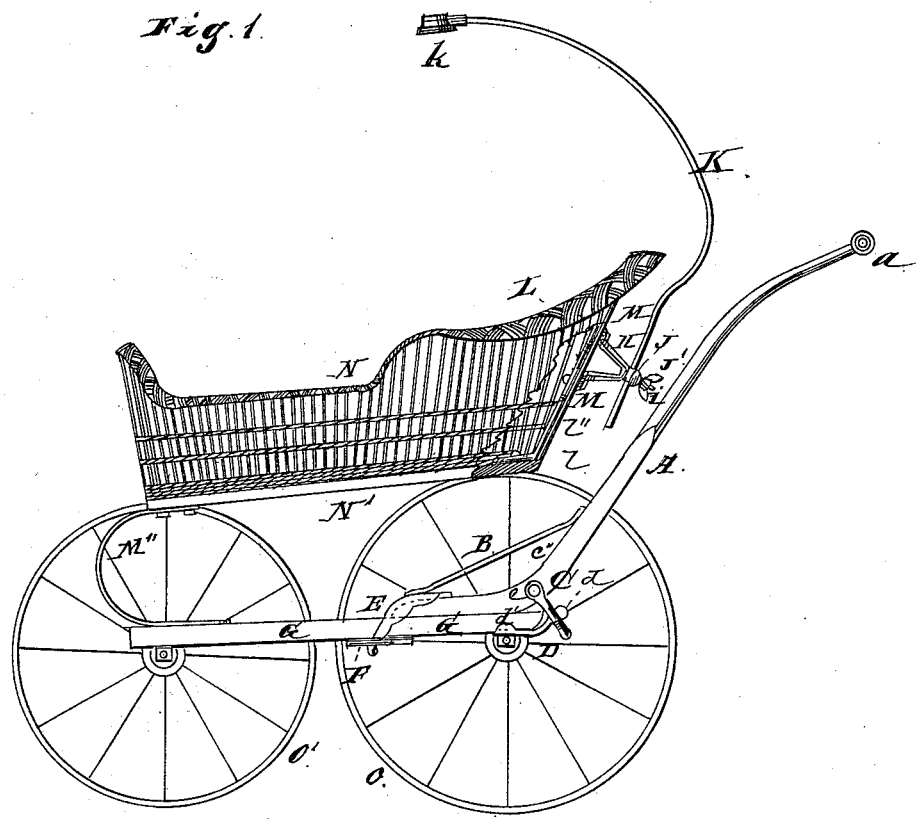
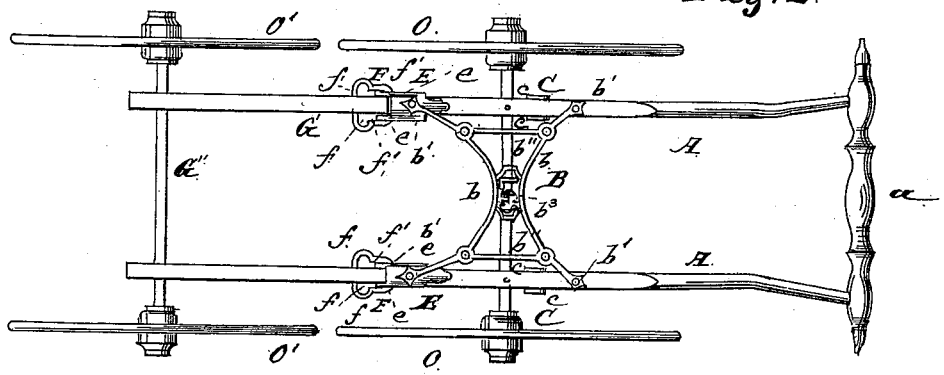
Witnesses:
O. W. Bond
Albert N. Adams
Inventor:
Lloyd G. Spencer (No Model.) 3 Sheets—Sheet 2.
L. G. SPENCER.
CHILD'S CARRIAGE.
No. 338,798. Patented Mar. 30, 1886.
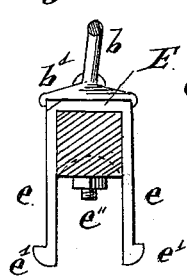
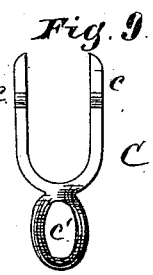
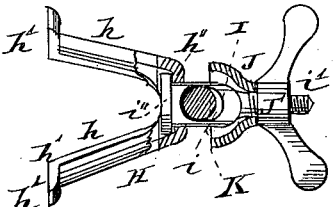
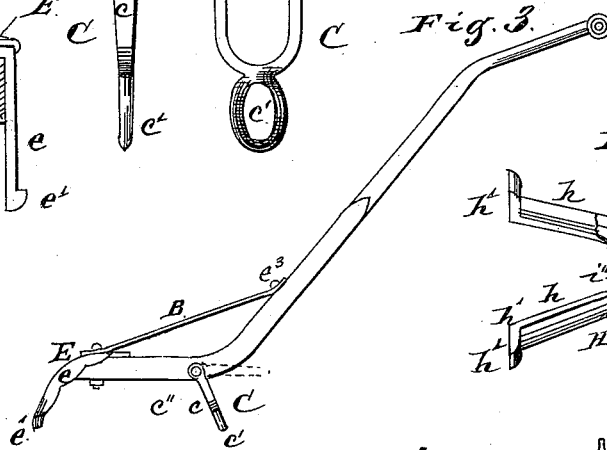
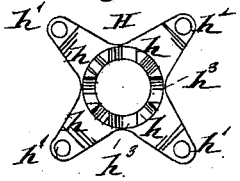
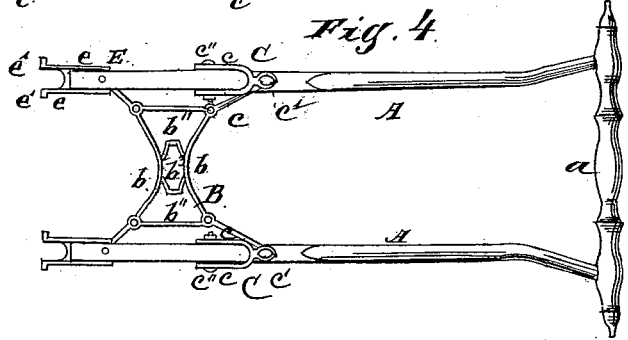
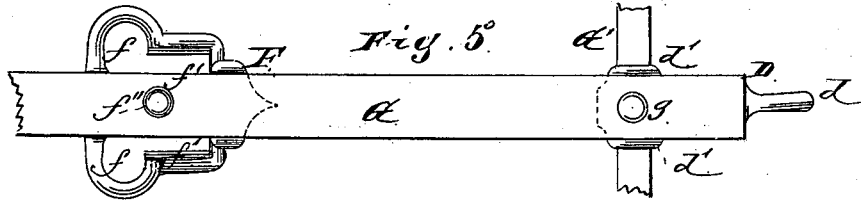
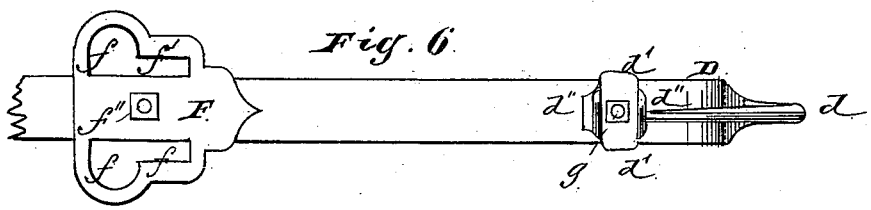
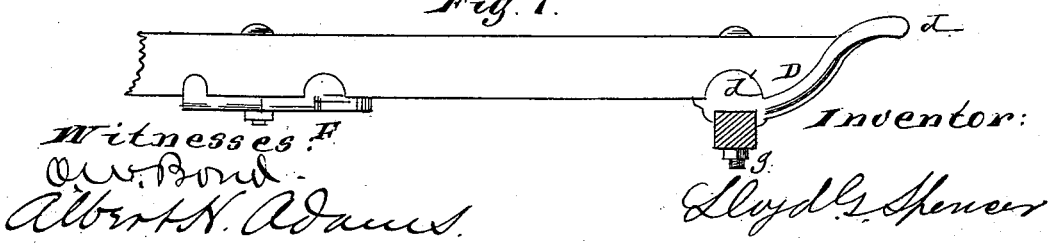
Witnesses:
O. W. Bond
Albert H. Adams
Inventor:
Lloyd G. Spencer (No Model.) 3 Sheets—Sheet 3.

L. G. SPENCER.
CHILD'S CARRIAGE.

No. 338,798. Patented Mar. 30, 1886.

Witnesses:
O. W. Bond
Albert H. Adams

Inventor:
Lloyd G. Spencer

N. PETERS. Photo-Lithographer, Washington, D. C.

UNITED STATES PATENT OFFICE.

LLOYD G. SPENCER, OF CHICAGO, ILLINOIS.

CHILD'S CARRIAGE.

SPECIFICATION forming part of Letters Patent No. 338,798, dated March 30, 1886.

Application filed October 30, 1885. Serial No. 181,387. (No model.)

*To all whom it may concern:*

Figure 13:
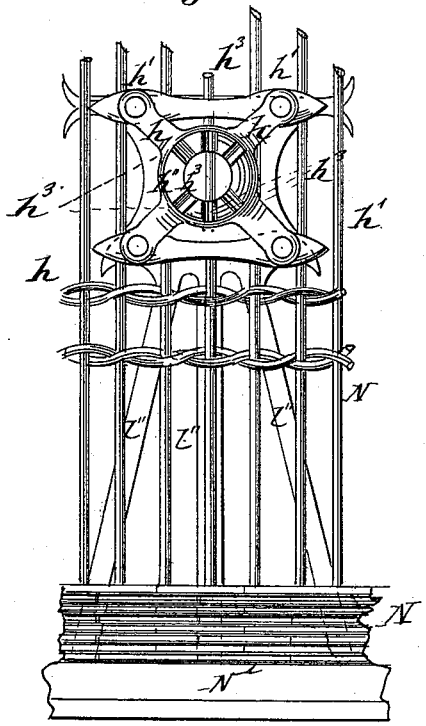
Figure 15:
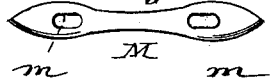
Figure 16:
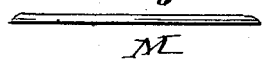
Figure 17:
Figure 19:
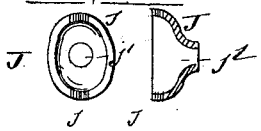
Figure 18:
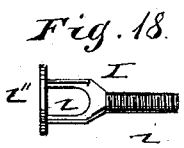
Figure 14:
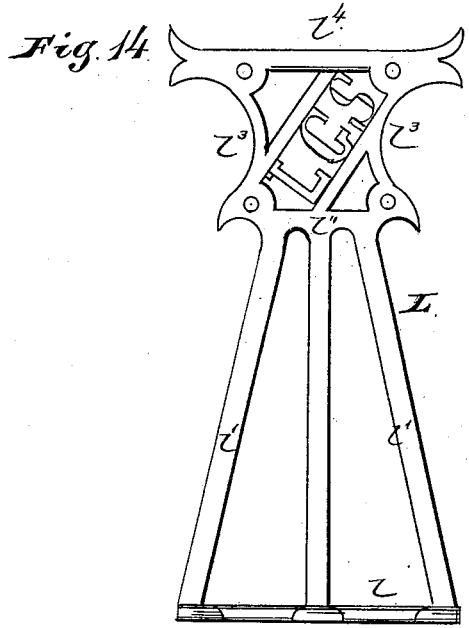
Figure 20:

Be it known that I, LLOYD G. SPENCER, residing at Chicago, in the county of Cook and State of Illinois, and a citizen of the United States, have invented certain new and useful Improvements in Children's Carriages, of which the following is a full description, reference being had to the accompanying drawings, in which—
Figure 1 is a side elevation; Fig. 2, a top view of the running-gear with the body removed; Fig. 3, a side elevation of the detachable handles; Fig. 4, an under side view of the handles; Figs. 5, 6, and 7, enlarged details, being a top view, bottom view, and side elevation of the rear end of the side rail; Figs. 8 and 9, enlarged details, being an edge and side elevation of the loop; Fig. 10, an enlarged detail showing the side rail of the handle in section, with the catch for locking with the side rail of the frame; Fig. 11, a side elevation, partly in section, of the clamp for the parasol-rod; Fig. 12, an end elevation of the bracket or support of the parasol-rod clamp; Fig. 13, a detail showing the bracket of the rod-clamp and the support or brace therefor, and the wicker-work of the basket or body; Fig. 14, a detail showing the brace or support for the wicker-work and the rod-clamp; Figs. 15 and 16, a face elevation and an edge view of the exterior plates on the basket for securing the rod-clamp; Figs. 17 and 18, details showing the clamping-bolt; Fig. 19, an edge view and a section of the movable portion of the rod-clamp; Fig. 20, an edge view of the support for the wicker-work and the rod-clamp.

This invention has for its objects to enable the handles of a child's carriage to be readily attached for rolling the carriage, or detached to have the carriage occupy smaller space when out of use; to give a varying adjustment to the rod carrying the parasol, by which the parasol can be secured vertical or inclined and firmly held in any position; to prevent the carrying of the parasol from tearing or breaking the body or wicker-work, and to improve the construction of the parts, as hereinafter more specifically described; and its nature consists in the several parts and combinations of parts hereinafter described, and pointed out in the claims as new, for attaining the objects sought.

In the drawings, A represents the side pieces forming the handle, the outer ends of which, as shown, are connected by a cross-piece, $a$, which handle, as a whole, is bent or curved to stand up, as usual.

B is a brace for the side pieces of the handle, formed of curved side pieces, $b$, with feet or heads $b'$ to fit the pieces A, and end pieces, $b''$, connecting the side pieces, and a center brace, $b^3$, these parts $b\ b'\ b''\ b^3$ being formed or cast in a single piece and forming an effectual brace against the side rack or strain on the handle, as a whole, in use.

C is a loop, one for each side piece, A, and each formed of side bars, $c$, and end piece, $c'$, the side bars receiving the side piece, A, and being pivotally attached thereto by a bolt or pin, $c''$.

D represents plates, one for each side piece of the body or running-gear, and secured to the rear end of the side piece. Each plate has a hook end, $d$, over which the loop C can be forced, the loop being placed on the side piece in such relation to the hook $d$ as that it can be forced over the hook, the hook passing between the under side of the side piece and the end piece of the loop, as shown in Fig. 1; and each plate D is provided with ears or lugs $d'$, between which the side piece of the running-gear lies, and with ears $d''$, to receive the axle in the arrangement shown.

E represents plates, one for each side piece, A, and attached to the side piece at the forward end. Each plate has forward and downwardly projecting arms $e$, and at the end of each arm is a hook or lug, $e'$, and, as shown, the arms are carried back onto the plate to form depending ears to fit over the sides of the piece A. The plates E are attached to the side piece by a bolt, $e''$, which bolt also passes through the lower foot, $b'$, of the brace B, the upper foot being attached to the side piece by a bolt, $e^3$, or in any other suitable manner.

F represents plates, one attached to the under side of each side bar of the running-gear at a point to receive the hooked arms $e$ of the plate E, for which purpose each plate F projects each side of the side piece to which it is attached, and has in the projecting portion a slot or opening, $f\,f''$, the portion $f$ being of sufficient size to pass the hook $e'$, and the portion $f'$ of sufficient size to receive the arm $e$ and prevent the withdrawal thereof by the engagement of the hook $e'$ with the bar of the slot.

G represents the side rails or pieces of the running-gear, to the rear end of which is secured a plate, D, and to each of which is also secured one of the plates F, by means of a bolt or rivet, $f''$, and so as to have a slot, $f\,f'$, on each side to receive the locking-arms of the plate E. At the rear end of the side bars, G, is attached the rear axle, G', by bolts $g$, which bolts also attach the plates D, and at the front end of the bars G is attached the front axle, G'', as usual.

H is a bracket, formed of legs $h$, each having a foot, $h'$, and connected to a head, $h''$, in the edge of which are formed grooves or recesses $h^3$, which recesses are formed on the upper and lower side of the head, as shown in Fig. 12, so as to have two of them stand vertical in line and two in line at an incline in opposite directions.

I is a bolt, having an enlarged body provided with a slot, $i$, a screw-threaded stem, $i'$, and a head, $i''$, the body passing through a hole in the end H'' of the bracket H, to have the head $i''$ engage the inner face of the end wall, $h''$.

J is a cap forming the movable jaw of the clamp, having its forward edge provided with a notch, $j$, on its upper and lower side, to co-act with the notches $h^3$ in the end wall of the bracket H, and having a hole, $j'$, for the passage of the stem $i'$ of the bolt, on which stem is a thumb-nut, J', by which the cap or jaw J can be advanced and receded.

K is the rod carrying the parasol, the stick of the parasol entering a head, $k$, on the end of the rod, as usual. This rod passes through the slot $i$ in the bolt I, and is clamped and securely held by forcing the cap or jaw J to impinge the rod between the end of the jaw and the bracket; and to hold the rod vertical it is clasped between the jaw and the bracket in the vertical holes $h^3$ and the holes $j$, and to hold it inclined it is clamped in the inclined holes $h^3$ and holes $j$. It will thus be seen that the rod is supported against side-pressure, whether in a vertical or inclined position, by the holes $h^3$ and the holes $j$, so that the parasol can be held directly overhead or inclined to either side, and be maintained in any position in which it is adjusted.

L is a bracing formed of a lower cross-bar, $l$, with feet $l'$, to be screwed or fastened to the bottom of the body, and upright bars $l''$, with a cross-bar at the top, connected by end bars, $l^3$, with a top cross-bar, $l^4$, and the cross-bars $l^3\,l^4$ are provided with holes which come in line with the holes in the feet $h'$, for the passage of rivets, screws, or bolts, by which the bracket H can be secured in place on the exterior of the wicker-work, the brace L being on the interior, and this brace supports the bracket entirely clear of the wicker-work of the body, and it receives the strain from the parasol and its rod without straining the wicker-work.

M represents plates, one for the upper and one for the lower legs of the brackets, which plates come outside of the wicker-work and in line with the upper and lower cross-plates of the support L, as shown in Fig. 13, through which plates the rivets for attaching the bracket pass.

N is the body or wicker-work, secured, as usual, to a bottom, N', to which the brace L is secured.

O' is the front wheels, and O the rear wheels, on the respective axles G'' G', as usual.

In use the handle is attached by slipping the hooks $e\,e'$ at the forward end of the side pieces, A, into the holding-plates F and drawing the hook-arms $e$ back into the narrow portion $f'$ of the slot, and then by means of the toe of the boot or shoe forcing the loops C over the end $d$ of the plate D, locking the handle as a whole firmly to the side bars of the running-gear, the toe being placed against the end $c'$ of the loop to force the loop over the catch $d$; and to detach the handle the loops C are withdrawn from engagement from the catches $d$ by the foot or hand, and the handle, as a whole, shoved forward to allow the hooks $e$ to be withdrawn from the holding-plates F, the hooks passing out through the enlarged portion $f$ of the slots. This arrangement enables the handles, as a whole, to be readily attached to or detached from the running-gear and body, and when attached the union is one as strong as though the handle were formed with or permanently attached to the side bars of the running-gear, and when detached the handle, as a whole, can be placed on the body or set up so that the carriage will occupy only the space required for the gear and body, and it also enables the carriages to occupy but small space for shipping purposes, as well as but a small space for storage.

The parasol-holder K is adjusted in any position desired, and to have the parasol hung overhead or at one side, by securing the rod in the vertical holes $h^3$ for overhead hang, or the inclined holes for side hang; and the rod can be readily changed from one position to another by loosening the thumb-nut J' sufficient to release the bite of the cap or jaw J, and withdrawing the rod from its holding-notches, and then turning it to the desired position and again clamping it in the holding-notches by turning up the thumb-nut to force the jaw J into bite again; and in setting the rod inclined the cap or jaw J is turned to have its notches $j$ coincide with the inclined notches $h^3$, with which the rod lines, by which means the rod is held by the notches $j\,h^3$, whether it stands vertical or inclined in either direction.

The strain from the parasol and its holding-rod in use is considerable, and is liable to tear the supporting-bracket from a wicker-work body, or injure such body by straining it; but by using the brace L on the inside of the wicker-work, and firmly secured at its base end to the bottom, the strain from the parasol and the rod is taken by this brace instead of the wicker-work, thus saving such wicker-work, and the attachment is made more secure by the exterior plates, N, as with these plates and the brace the wicker-work is clamped between them, so as not to be strained or torn out in use. This brace L can be formed to fit a curved or straight back, and it can be formed of material possessing sufficient rigidity for withstanding the strain in use, and yet be flexible enough to be bent to fit the shape of the back. The plates D in the arrangement shown also act as clips to secure the side bars and the rear axle in position; but such plates can be made to act as the hook-plates only to receive the loops C, and in use the loops C and hook-plates D have such relation to each other that when the loops are forced over the hooks they will exert a drawing action to hold the handle firmly.

What I claim as new, and desire to secure by Letters Patent, is—

1. In a child's carriage, the combination, with the parallel side bars, G, and the handle side pieces, A, secured thereto, of a brace comprising curved pieces $b\, b$, having feet $b'\, b'$, fitted to the handle side pieces, substantially as described.

2. In a child's carriage, the combination, with the side bars, G, and the handle side pieces, A, having their forward ends detachably secured to said bars, of the swinging loops C and catch-plates D, for locking and unlocking the handle, substantially as described.

3. In a child's carriage, the combination, with the side bars, G, having holding-plates F, and the handle side pieces, A, having at their forward ends hook-plates E, to engage said holding-plates, of a catch-lock for securing the handle side pieces to the rear ends of the side bars, substantially as described.

4. The side bars, A, of a handle, swinging loops C, and hook-plates E, in combination with the catch-plates D, holding-plates F, and side bars, G, for detachably securing the handle to the running-gear, substantially as and for the purpose specified.

5. The swinging loop C and stationary hook-plate E, both carried by a handle, in combination with the catch-plate D and holding-plate F, both attached to the running-gear, for connecting and disconnecting the handle, substantially as and for the purpose specified.

6. The bracket H, having an end face provided with notches $h^3$, in combination with a slotted bolt, I, and cap or clamp J, having notches $j$, for securing the parasol-rod in varying positions, substantially as specified.

7. The combination, with a wicker-work body, of a brace-plate, L, and a parasol-support for removing the strain from the wicker-work or body, substantially as specified.

8. The combination, with the parallel side bars, G, and the handle side pieces, A, detachably secured thereto, of a brace, B, having curved pieces $b\, b$, provided with feet $b'\, b'$, fitted to the handle side pieces, said curved brace-pieces being connected by parallel straight pieces $b''\, b''$, substantially as described.

LLOYD G. SPENCER.

Witnesses:
O. W. BOND,
ALBERT H. ADAMS.